(12) United States Patent
Hiraoka et al.

(10) Patent No.: US 7,267,003 B2
(45) Date of Patent: Sep. 11, 2007

(54) ACCELERATION SENSOR UNIT

(75) Inventors: Yuji Hiraoka, Tokyo (JP); Tohru Matsumoto, Tokyo (JP); Yukihiro Okimoto, Tokyo (JP); Toshiyuki Yamashita, Tokyo (JP); Shinichi Harase, Tokyo (JP); Takashi Furui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/915,353

(22) Filed: Aug. 11, 2004

(65) Prior Publication Data

US 2005/0066724 A1    Mar. 31, 2005

(30) Foreign Application Priority Data

Sep. 30, 2003   (JP)  ............................ P2003-339504

(51) Int. Cl.
    *G01P 1/02*     (2006.01)
(52) U.S. Cl. ........................................... 73/493; 73/431
(58) Field of Classification Search .................. 73/493, 73/431, 514.16, 514.29
See application file for complete search history.

(56) References Cited

U.S. PATENT DOCUMENTS

| | | | |
|---|---|---|---|
| 4,700,973 A * | 10/1987 | Gademann et al. .......... 280/735 |
| 5,406,454 A * | 4/1995 | Dinger et al. ................ 361/752 |
| 5,631,421 A * | 5/1997 | Ohgke et al. ............ 73/514.34 |
| 5,644,081 A * | 7/1997 | Schwarz et al. ............... 73/493 |
| 5,942,685 A * | 8/1999 | Tabota .......................... 73/493 |
| 6,094,984 A * | 8/2000 | Asano et al. .................. 73/493 |
| 6,305,223 B1* | 10/2001 | Matsumoto et al. ...... 73/514.32 |
| 6,494,092 B2* | 12/2002 | Ueyanagi et al. .............. 73/493 |
| 6,810,736 B2* | 11/2004 | Ikezawa et al. ................ 73/493 |

FOREIGN PATENT DOCUMENTS

| | | |
|---|---|---|
| DE | 197 38 358 A1 | 4/1998 |
| JP | 07-012841 A | 1/1995 |
| JP | 09-207706 A | 8/1997 |
| JP | 10-035408 A | 2/1998 |

* cited by examiner

*Primary Examiner*—Helen Kwok
(74) *Attorney, Agent, or Firm*—Sughrue Mion, PLLC

(57) ABSTRACT

An acceleration sensor unit including a board on which an acceleration sensor is mounted, a support part for supporting the board, and a housing in which the support part and the acceleration sensor are contained, the board is installed in the housing by means of the support part so as to swing with respect to the housing.

14 Claims, 4 Drawing Sheets

ACCELERATION SENSOR UNIT

BACKGROUND OF THE INVENTION

1. Field of the Invention

The present invention relates to an acceleration sensor unit provided with an acceleration sensor for detecting acceleration, and more particularly to the acceleration sensor unit of on-vehicle type which is used in an environment where vibrations are liable to occur.

2. Description of the Related Art

In a conventional acceleration sensor unit, a board on which an acceleration sensor is mounted has been fixed to a housing. (For example, see JP-A-9-207706, JP-A-7-12841 and JP-A-10-35408)

SUMMARY OF THE INVENTION

In a conventional acceleration sensor unit, because a board on which the acceleration sensor is mounted has been fixed to a housing an impact force of a high frequency component which is regarded as unnecessary for judging magnitude of collision (which is utilized for deciding whether or not an air bag should be expanded) has been transmitted from the housing to a fixed board. The board vibrates in resonance with the high frequency component, and then, transmitted to the acceleration sensor in an amplified state.

Moreover, particularly in case where a resonant frequency of the board and the resonant frequency of the acceleration sensor are close to each other, an S/N ratio of the acceleration sensor has been sometimes deteriorated.

This invention has been made in order to solve the above described problem, and it is an object of the invention to reduce high frequency components which are transmitted to the acceleration sensor.

It is another object of the invention to enhance the S/N ratio of the acceleration sensor.

According to this invention, there is provided an acceleration sensor unit including a board on which an acceleration sensor is mounted, a support part for supporting the board, and a housing in which the support part and the aforesaid acceleration sensor are contained, wherein the board is installed in the housing by means of the support part so as to swing with respect to the housing.

Moreover, the support part includes pins which connect the board to an exterior.

Further, resonant frequency of the board and resonant frequency of the acceleration sensor are made different from each other.

In the acceleration sensor unit according to this invention, because the board is installed by means of the support part so as to swing with respect to the housing, the resonant frequency of the board can be reduced.

Moreover, because the support part includes the pins which connect the board to the exterior, the structure can be simplified.

Further, because the resonant frequency of the board and the resonant frequency of the acceleration sensor are made different from each other, the S/N ratio of the acceleration sensor can be enhanced.

BRIEF DESCRIPTION OF THE DRAWING

These and other objects and advantages of this invention will become more fully apparent from the following detailed description taken with the accompanying drawings in which:

FIG. 3 shows a board according to Embodiment 1 of the invention, of which

DETAILED DESCRIPTION OF THE PREFERRED EMBODIMENTS

Now, an embodiment of this invention will be described.

Figure 1:
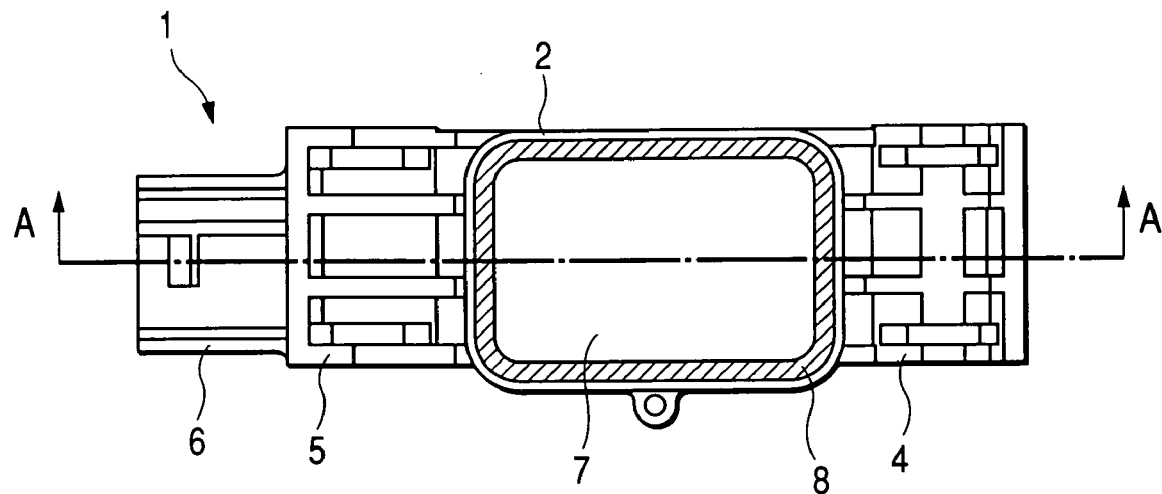
FIG. 1 is a plan view of an acceleration sensor unit according to Embodiment 1 of the invention.
Figure 2:
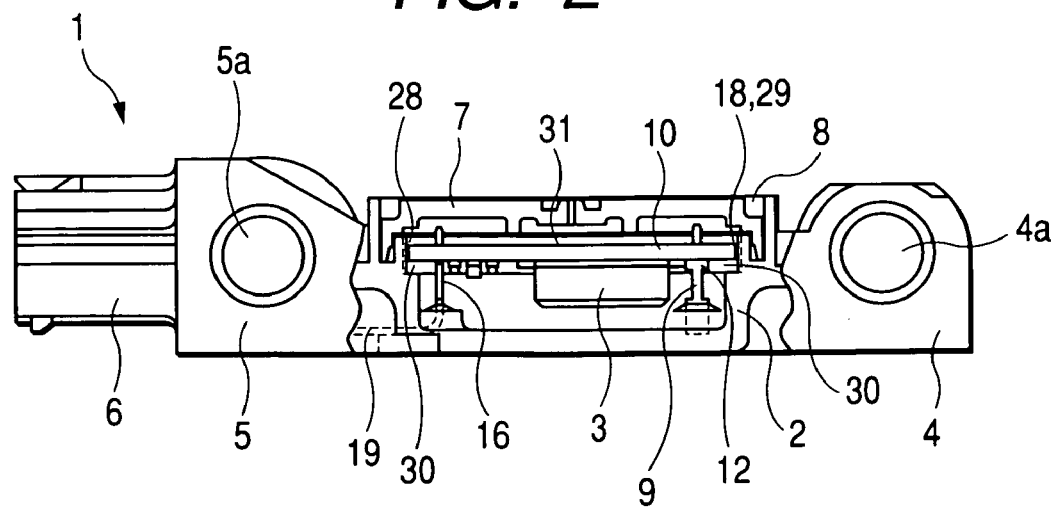
FIG. 2 is a fragmental sectional view showing a part of a side view of the acceleration sensor unit according to Embodiment 1 of the invention, taken along a line A-A in FIG. 1.
Figure 3A:
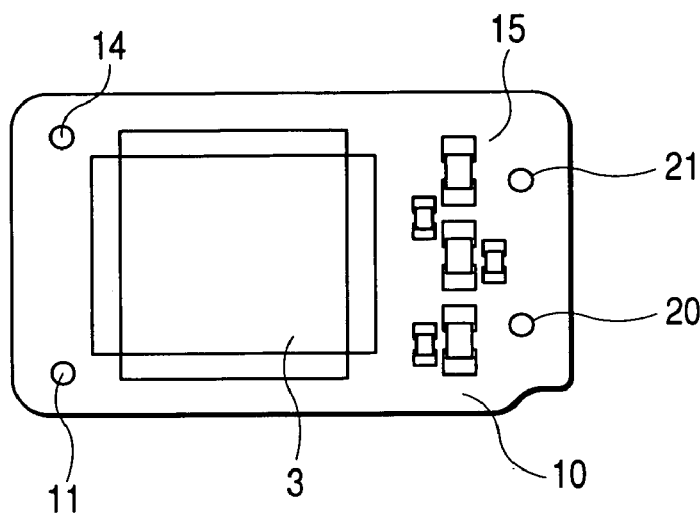
FIG. 3A is a plan view and FIG. 3B is a side view.
Figure 3B:
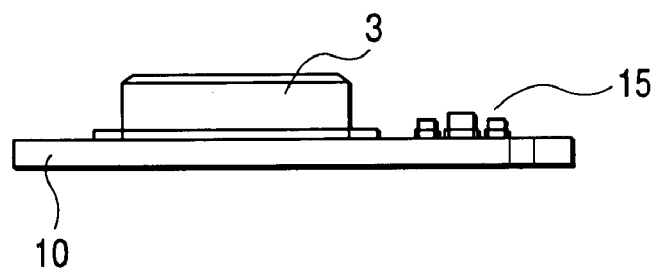

FIG. 1 is a plan view of an acceleration sensor unit according to the embodiment of the invention, FIG. 2 is a fragmental sectional view showing a part of a side view of the acceleration sensor unit taken along a line A-A in FIG. 1, FIG. 3 shows a board, of which FIG. 3A is a plan view and FIG. 3B is a side view.

Figure 4:
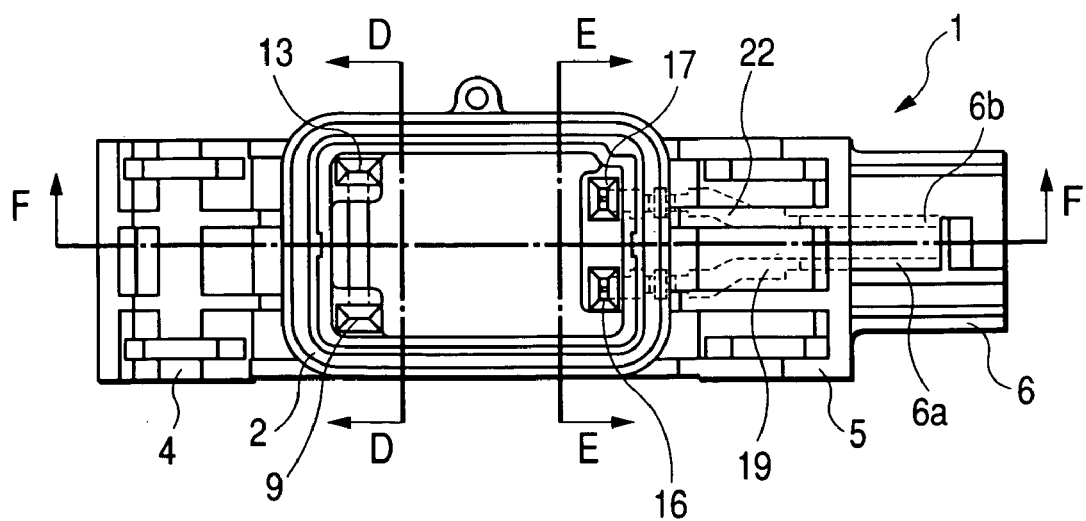
FIG. 4 is a plan view of the acceleration sensor unit as shown in a simplified state for explaining a manner of supporting the board inside the housing.
Figure 5:
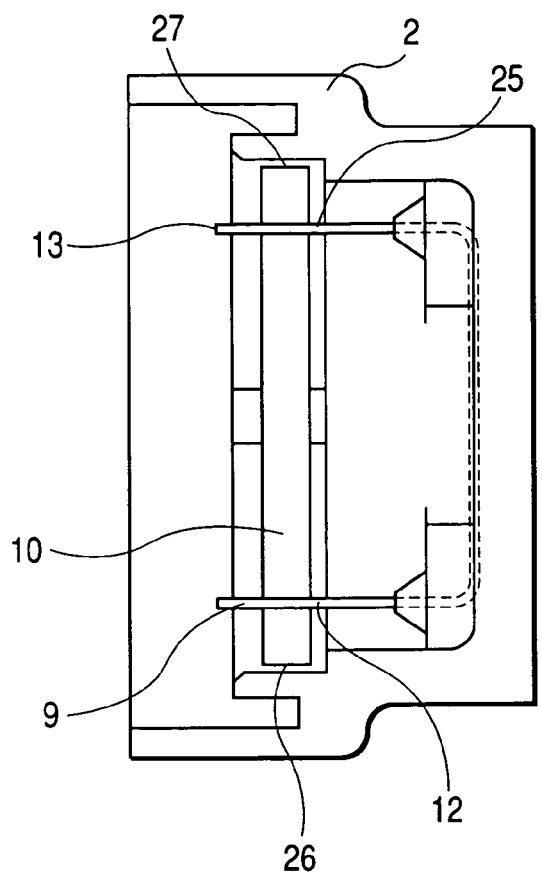
FIG. 5 is a sectional view taken along a line D-D in FIG. 4.
Figure 6:
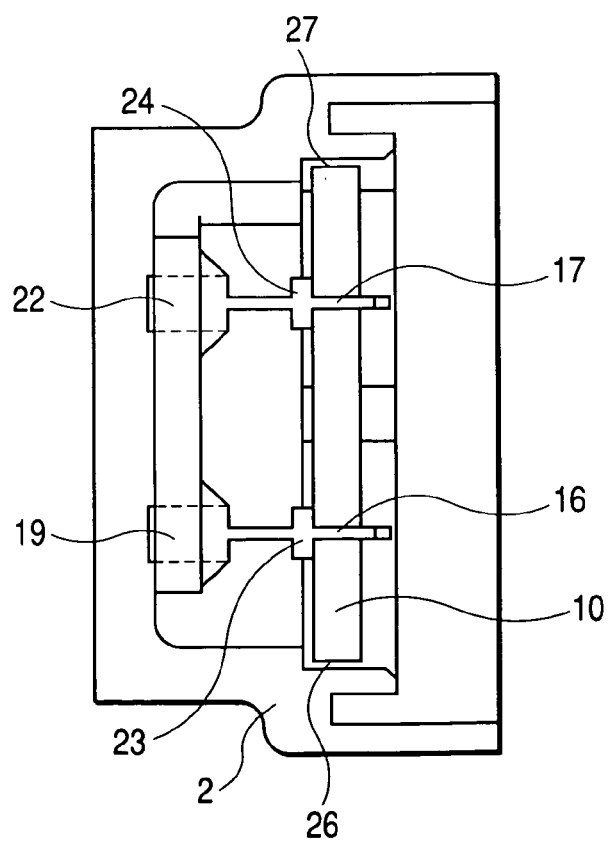
FIG. 6 is a sectional view taken along a line E-E in FIG. 4.
Figure 7:
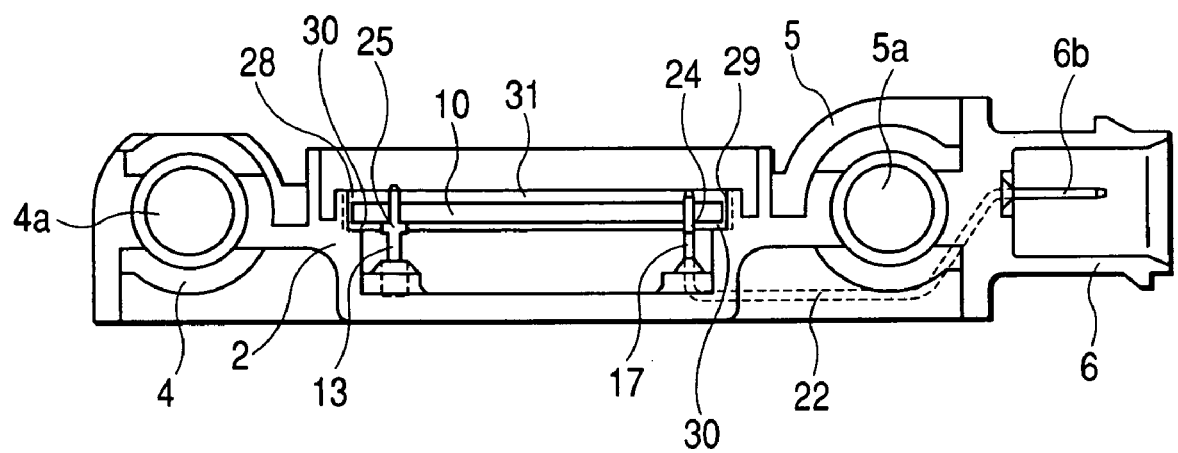
FIG. 7 is a sectional view taken along a line F-F in FIG. 4.

FIG. 4 is a plan view of the acceleration sensor unit as shown in a simplified state for explaining a manner of supporting the board inside the housing, FIG. 5 is a sectional view taken along a line D-D in FIG. 4, FIG. 6 is a sectional view taken along a line E-E in FIG. 4, and FIG. 7 is a sectional view taken along a line F-F in FIG. 4. It is to be noted that the board is omitted in FIG. 4, while, in FIGS. 5 to 7, the board is added to the structure of FIG. 4.

In these drawings, numeral 1 is an acceleration sensor unit provided in a side part or a front part of an automobile, 2 is a housing for containing an acceleration sensor 3 and so on, and 3 is the acceleration sensor in which an acceleration detecting element (such as a capacitive detecting element of a comb teeth-shaped electrode type, and a piezo-resistance type detecting element) is provided. An ASIC for dealing with signals may be also provided in the acceleration sensor 3. Numerals 4 and 5 are mounting parts for mounting the acceleration sensor unit 1 on a mounting position of a vehicle which is not shown, and these mounting parts 4, 5 are respectively provided with bolt holes 4a, 5a into which bolts on a vehicle side which are not shown are to be inserted. Numeral 6 is a connector part for outputting outputs of the acceleration sensor unit 1 to the exterior. An exterior connector which is not shown is connected to the connector part 6, and signals are sent from the exterior connector to an ECU for expanding an air bag, for example, thereby to perform expansion of the air bag.

Numeral 7 is a plate which functions as a lid for the housing 2, and a gap between the plate 7 and the housing 2 is sealed (tightly closed) with a resin 8.

Numeral 9 is a pin which is projected from the housing 2 and inserted into a hole 11 in the board 10. The pin 9 is provided with a flange 12 for positioning the board 10, at its intermediate part. Moreover, a pin 13 is provided in the same manner as the pin 9. The pin 13 is inserted into a hole 14 in the board 10 and provided with a flange 25 for positioning the board 10, at its intermediate part.

Numeral 10 is the board on which the acceleration sensor 3 and other elements 15 such as resistors are mounted. The board 10 is supported by means of the pins 9, 13 and lead pins 16, 17 keeping a determined space 18 from the housing 2.

Numeral 16 is the lead pin which is connected to a terminal 6a in the connector 6 by way of a connecting wire 19. The lead pin 16 is also inserted into a hole 20 in the board 10 thereby to be connected to a wiring on the board 10, so that the outputs from the acceleration sensor 3 can be outputted to the connector 6.

The lead pin 17 which is also provided in the same manner is inserted into a hole 21 in the board 10, and connected to the terminal 6b by way of a connecting wire 22.

The lead pins 16, 17 are provided with flanges 23, 24 for positioning the board 10, at their respective intermediate parts.

As shown herein in FIGS. 5 and 6, there are provided gaps 26, 27 between the board 10 and the housing 2, and as shown in FIGS. 2 and 7, there are provided gaps 28, 29 between the board 10 and the housing 2. In the manner, the board 10 is not in contact with the housing 2 along its entire circumference, but supported by means of the pins 9, 13 and the lead pins 16, 17. Moreover, the board 10 is placed on the respective flanges 12, 25, 23 and 24 of the pins, and has a gap 30 with respect to the housing 2 and a gap 31 with respect to the plate 7 in a vertical direction too. As the results, the board 10 is supported by means of the pins 9, 13 and the lead pins 16, 17 without getting in contact with the housing 2 and the plate 7.

The pins have more or less elasticity, because they are formed of metallic material such as brass which is the material generally used for the lead (The pins may be formed of non-conductive material in case where they need not have a function as the lead (connecting wire)). Accordingly, on occasion of a car crush or some other accident, the pins may be deformed.

As the results, the board 10 is supported so as to swing with respect to the housing 2, and because of being capable of swinging, the board 10 has a so-called damper function. Therefore, even though a vibration or shock is transmitted to the housing from the exterior, the vibration or shock from the exterior will not be easily transmitted to the acceleration sensor 3 which is mounted on the board 10, and particularly, transmission of the high frequency components can be prevented.

By supporting the board 10 in the manner so as to swing with respect to the housing 2, resonant frequency of the board 10 can be reduced from 5 kHz to 1 kHz, for example.

In case where the resonant frequency of the acceleration sensor is 5 kHz, for example, the resonant frequency of the board 10 and the resonant frequency of the acceleration sensor can be made different from each other.

In the manner, deterioration of the S/N ratio of the acceleration sensor due to the resonance between the board and the acceleration sensor can be prevented.

The resonant frequency of the acceleration sensor includes the resonant frequency of the acceleration sensor itself and the resonant frequency of the acceleration detecting element itself inside the acceleration sensor. Particularly in case where the resonant frequency of the acceleration detecting element is made different from the resonant frequency of the board, the S/N ratio can be enhanced more effectively.

Further, the capacitive sensor of the comb teeth-shaped electrode type includes a fixed electrode in a comb teeth shape, a movable electrode, and a stopper. Therefore, the movable electrode will get in touch with the stopper when it is resonated and displaced significantly, and this will incur deterioration of the S/N ratio. In case where the resonant frequency of the movable electrode is made different from the resonant frequency of the board, the S/N ratio can be enhanced more effectively.

In the case, by supporting the board 10 so as to swing with respect to the housing 2, the board 10 has the damping effect, and even though an impact wave of the high frequency has been transmitted to the housing 2, the board 10 can exclude the relevant high frequency component because of the damping effect. Usually, the high frequency component is regarded as unnecessary for judging the magnitude of collision for the air bag, and there have been adopted a method of removing the high frequency components through a low pass filter (a filter for cutting the high frequency components) or the like, or other methods. Because the high frequency component can be excluded, it is possible, according to the invention, to simplify or omit the low pass filter.

In the case, since the acceleration sensor unit is generally installed in a vehicle room (that is, inside a crushable zone), an impact force will not be directly transmitted to the acceleration sensor unit, but particularly the high frequency component will be transmitted after being damped through the crushable zone. In short, the crushable zone attains a kind of damping effect.

On the other hand, in order to make a judgment for the air bag with higher response, the acceleration sensor unit is sometimes installed in the crushable zone (a part which is particularly provided to be easily deformed by an impact force at the time of collision thereby to absorb the impact force of the collision) in a front part or a side part of the vehicle. On the occasion, the impact force which has not passed through the crushable zone may be directly applied to the acceleration sensor unit. As the results, particularly the high frequency component of the impact force will be directly applied to the acceleration sensor unit.

In the manner, particularly in case where the acceleration sensor unit which has been described in the embodiment is installed in the crushable zone, the board will have the damping function instead of the crushable zone, and attenuation of the high frequency component can be made by the board.

It is to be noted that because such high frequency component is unnecessary for judging the magnitude of the collision (for deciding whether or not the air bag should be expanded), the high frequency component should be desirably attenuated.

Further, in case where a large high frequency component is generated, there will occur a necessity of using the acceleration sensor which has a high detecting range, that is, the acceleration sensor of non general purpose type having a high detecting range. However, because the high frequency component can be attenuated or excluded by the damping effect of the board, it would be possible, according to the invention, to use the acceleration sensor of general purpose type having a low detecting range, and unit prices of the parts can be reduced.

In addition, since the resin in a gel form is applied inside the housing, it would be possible to make the board swing more smoothly thereby to enhance the damping effect.

Further, in the embodiment, the board 10 is fixed only to the lead pins 16, 17 by soldering or other means, but not fixed to the pins 9, 13. In other words, the pins 9, 13 can be displaced within the respective holes 10, 15 in the board.

As the results, the board 10 will be able to swing more significantly, and the damping effect can be enhanced.

It is to be noted that even though the pins 9, 13 are fixed to the board 10 by soldering or other means, the damping effect can be also obtained by the elasticity of the pins 9, 13.

Although the structure in which the board is supported by being placed on the flange portions of the pins has been shown in the embodiment, the board may be supported by some other means, for example, the board may be suspended by the pins.

Although the acceleration sensor having the acceleration detecting element provided therein has been shown in the embodiment, the acceleration sensor may be the acceleration detecting element itself, and further, may be an integral body formed of the acceleration sensor and the board, or the acceleration detecting element and the board.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An acceleration sensor unit comprising:
   a board on which an acceleration sensor is mounted;
   a plurality of support parts for supporting the board, at least one of the support parts being non-conductive; and
   a housing in which the support parts and the acceleration sensor are contained,
   wherein the board is installed in the housing by means of the support parts so that the board and the acceleration sensor are able to swing with respect to the housing, and
   wherein the at least one of the support parts that is non-conductive extends through a hole in the board, such that the at least one of the support parts that is non-conductive is moveable within the hole.

2. The acceleration sensor unit according to claim 1, wherein the support parts include pins which connect the board to an exterior.

3. The acceleration sensor unit according to claim 1, wherein resonant frequency of the board and resonant frequency of the acceleration sensor are made different from each other.

4. The acceleration sensor unit according to claim 1, wherein the support parts include pins and the board is positioned at an intermediate portion of the pins.

5. The acceleration sensor unit according to claim 1, wherein the board includes a plurality of holes and the support parts respectively extend through the holes.

6. The acceleration sensor unit according to claim 1, wherein the support parts elevate the board to provide an open space between the board and the housing.

7. An acceleration sensor unit comprising:
   a board on which a capacitive acceleration sensor of a comb teeth-shaped electrode type is mounted;
   a support part for supporting the board; and
   a housing in which the support part and the acceleration sensor are contained,
   wherein the board is installed in the housing by means of the support part so as to be able to swing with respect to the housing.

8. The acceleration sensor unit according to claim 1, wherein the at least one of the support parts that is non-conductive has a flange that abuts the board.

9. The acceleration sensor unit according to claim 7, wherein the board includes a hole and the support part extends through the hole, such that the support part is movable within the hole, and wherein the support part is non-conductive.

10. The acceleration sensor unit according to claim 7, wherein the board includes a hole and the support part extends through the hole, such that the support part is movable within the hole, and wherein the support part has a flange that abuts the board.

11. An acceleration sensor unit comprising:
    a board on which an acceleration sensor is mounted;
    a support part for supporting the board so that the board swings with respect to the housing; and
    a housing in which the support part and the acceleration sensor are contained, wherein:
    the support part comprises a positioning part that restricts a mounting position of the board, and
    the positioning part makes a resonant frequency of an element of the acceleration sensor and a resonant frequency of the board different from each other by restricting the mounting position of the board.

12. The acceleration sensor unit according to claim 11, wherein the positioning part makes the resonant frequency of the board lower than the resonant frequency of the element of the acceleration sensor.

13. The acceleration sensor unit according to claim 11, wherein the support part comprises pins, which connect the board to an exterior.

14. The acceleration sensor unit according to claim 11, wherein the acceleration sensor is a capacitive acceleration sensor.

* * * * *